United States Patent
Caron-L'Ecuyer et al.

(10) Patent No.: US 11,248,727 B2
(45) Date of Patent: Feb. 15, 2022

(54) DUCT COUPLING SYSTEM

(71) Applicant: Bombardier Inc., Dorval (CA)

(72) Inventors: Alexis Caron-L'Ecuyer, Lachine (CA); Andre Brodeur, Laval (CA)

(73) Assignee: Bombardier Inc.

( * ) Notice: Subject to any disclaimer, the term of this patent is extended or adjusted under 35 U.S.C. 154(b) by 21 days.

(21) Appl. No.: 16/717,714

(22) Filed: Dec. 17, 2019

(65) Prior Publication Data

US 2020/0191307 A1 Jun. 18, 2020

Related U.S. Application Data

(60) Provisional application No. 62/780,751, filed on Dec. 17, 2018.

(51) Int. Cl.
*F16L 27/10* (2006.01)
*F16L 23/22* (2006.01)

(52) U.S. Cl.
CPC .......... *F16L 27/1021* (2013.01); *F16L 23/22* (2013.01); *F16B 2200/506* (2018.08)

(58) Field of Classification Search
CPC ... F16L 27/1012; F16L 27/10; F16L 27/1021; F16L 55/037
See application file for complete search history.

(56) References Cited

U.S. PATENT DOCUMENTS

| | | | | |
|---|---|---|---|---|
| 1,862,153 A | * | 6/1932 | Lee | F16L 27/1021 285/231 |
| 2,339,332 A | * | 1/1944 | Hauf | F16L 27/1012 285/342 |
| 2,396,078 A | * | 3/1946 | Box | F16L 27/1021 285/231 |
| 3,194,589 A | * | 7/1965 | Bohls | F16L 27/1021 285/49 |
| 4,182,434 A | * | 1/1980 | Munz | F16L 27/1021 188/268 |
| 4,198,078 A | * | 4/1980 | Herbert | F16L 55/0332 285/223 |
| 4,747,624 A | | 5/1988 | Faber et al. | |

(Continued)

FOREIGN PATENT DOCUMENTS

| | | | | |
|---|---|---|---|---|
| CH | 578146 A5 | * | 7/1976 | .......... F16L 27/1021 |
| DE | 2062479 A1 | * | 7/1972 | .......... F16L 27/1012 |

(Continued)

*Primary Examiner* — David Bochna
(74) *Attorney, Agent, or Firm* — Fishman Stewart PLLC

(57) ABSTRACT

A duct coupling system includes a first and second duct, a vibration attenuation system, a rigid ring, and a fastening system. The first duct has a first flange aligned with a second flange of the second duct. The vibration attenuating system abuts a first side and a second side of the first flange and abuts a first side of the second flange. A portion of the vibration attenuating system encircles the first duct. The vibration attenuating system is configured to attenuate vibrations passing between the first and second ducts. The rigid ring encircles the first duct and abuts the vibration attenuation system. The fastening system couples the first duct to the second duct and compresses the vibration attenuating system. The rigid ring does not contact the first duct and the first duct does not contact the second duct.

14 Claims, 8 Drawing Sheets

(56) References Cited

U.S. PATENT DOCUMENTS

| | | | | |
|---|---|---|---|---|
| 5,248,168 A | * | 9/1993 | Chichester | F16L 27/1021 285/232 |
| 5,314,214 A | * | 5/1994 | Highlen | F16L 27/1021 285/231 |
| 5,967,565 A | | 10/1999 | Kim | |
| 7,198,303 B2 | | 4/2007 | Brophy, III et al. | |
| 8,079,773 B2 | | 12/2011 | Blanton | |
| 2004/0135366 A1 | | 7/2004 | Sasada et al. | |
| 2008/0084065 A1 | | 4/2008 | Ogimura | |

FOREIGN PATENT DOCUMENTS

| | | | | |
|---|---|---|---|---|
| DE | 3610684 A1 | * | 1/1987 | F16L 27/1021 |
| EP | 1083377 A1 | * | 3/2001 | F16L 27/1012 |
| EP | 1094267 A1 | * | 4/2001 | F16L 27/1021 |

* cited by examiner

DUCT COUPLING SYSTEM

CROSS-REFERENCE TO RELATED APPLICATIONS

This application claims the benefit of U.S. Provisional Application Ser. No. 62/780,751 filed on Dec. 17, 2018. Further, the U.S. Provisional Application Ser. No. 62/780,751 is incorporated herein by reference in its entirety.

FIELD OF TECHNOLOGY

An improved duct coupling system is disclosed. Improvements are applicable to aircrafts and other systems that employ ducting.

BACKGROUND

Cabin pressure in an aircraft is generally controlled by one or more outflow valves. As cabin pressure increases, cabin air is let out to the outside atmosphere via the one or more outflow valves to keep the cabin pressure within desired levels. Often, an outflow valve is coupled to the interior of an aircraft via ducting and a cabin pressurization controller generally controls the outflow valve. To maintain cabin pressure, the cabin pressurization controller causes the one or more outflow valves to open or close. As the outflow valve(s) open, more cabin air is allowed to pass out of the aircraft. As such, pressure is decreased or maintained. Similarly, as cabin pressure decreases, the outflow valve(s) close to limit the air leaving the cabin. As such, cabin pressure is increased or maintained.

Rigid ducting generally couples an inlet/outlet from an aircraft exterior to an outflow valve on the interior of the aircraft. The outflow valve may be positioned within the ducting or coupled between two ducting sections within the aircraft.

Since an aircraft exterior is coupled to an outflow valve(s), turbulent exterior air passing over the inlet/outlet hole may cause vibrations to pass through the outflow valve and any ducting coupled thereto. These vibrations may be felt in the aircraft. Further, these vibrations can cause noise that may be heard in the aircraft cabin.

To minimize the vibrations and noise transferred to the aircraft cabin, rubber duct couplers may be employed. That is, ducting sections may be coupled together via rubber couplers. Since these couplers are not as rigid as the ducting itself, vibrations passing down the ducting are attenuated when they pass through the rubber coupling(s).

These rubber duct couplers may be rubber cylinders having some type of duct clamp at each end of the cylinder. Such couplers, however, often do not provide much support for the ducting itself. That is, the flexible nature of the rubber cylindrical couplers often allows unintended movement between adjoined ducts. In turn, this unintended movement may cause the outflow valve(s) to move. Unintended movement of an outflow valve may cause the outlet valves not to function properly.

As such, there is a need for improvements in ducting couplers.

DETAILED DESCRIPTION

Figure 1:
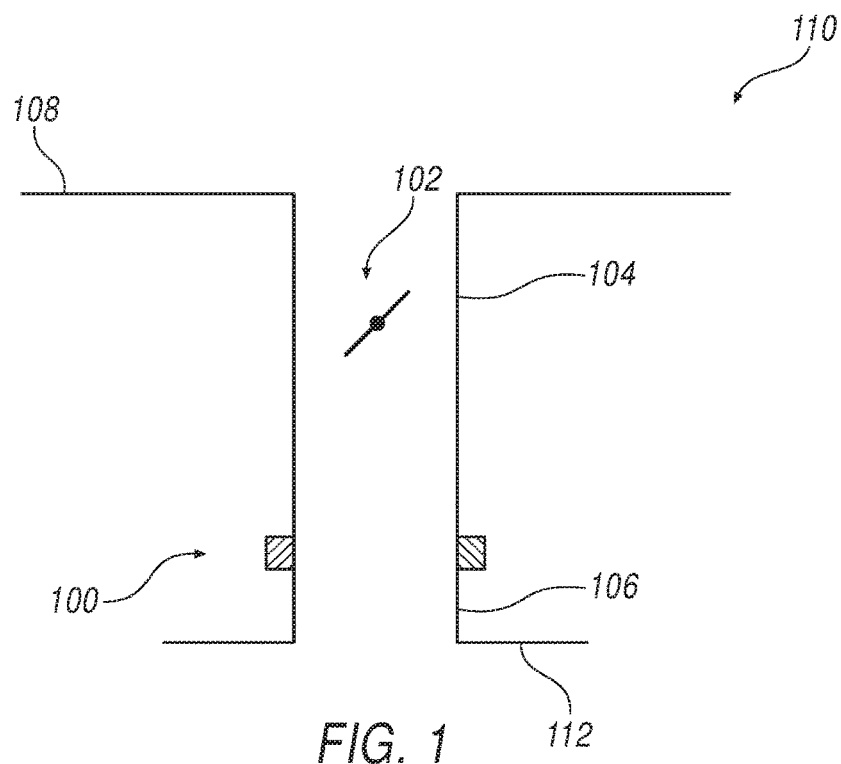
FIG. 1 illustrates a cross-sectional view of an exemplary duct coupling system coupled to an outflow valve.

FIG. 1 illustrates a cross-sectional view of an exemplary duct coupling system 100 supporting an outflow valve 102. The duct coupling system 100 couples a first duct 104 to a second duct 106 and allows airflow through the ducts 104, 106 and the outflow valve 102. The ducts 104, 106 may be comprised of a rigid material such as aluminum, polyvinyl chloride (PVC), or the like. The first duct 104 has the outflow valve 102 integrated therein and is coupled to an exterior 108 of an aircraft 110. The second duct 106 is coupled to an aircraft cabin 112. The outflow valve 102 helps maintain the proper pressure in the aircraft cabin 112 by controlling airflow in and out of the aircraft 110.

During flight, vibrations from the exterior 108 of the aircraft 110 may pass through the outflow valve 102 and the first duct 104. The duct coupling system 100 attenuates the vibrations passing through the first duct 104. As such, the vibrations passing into the second duct 106 are minimized and cabin noise is reduced. The duct coupling system 100 is resilient and is able to support at least the outflow valve 102 and first duct 104 if needed.

Figure 2:
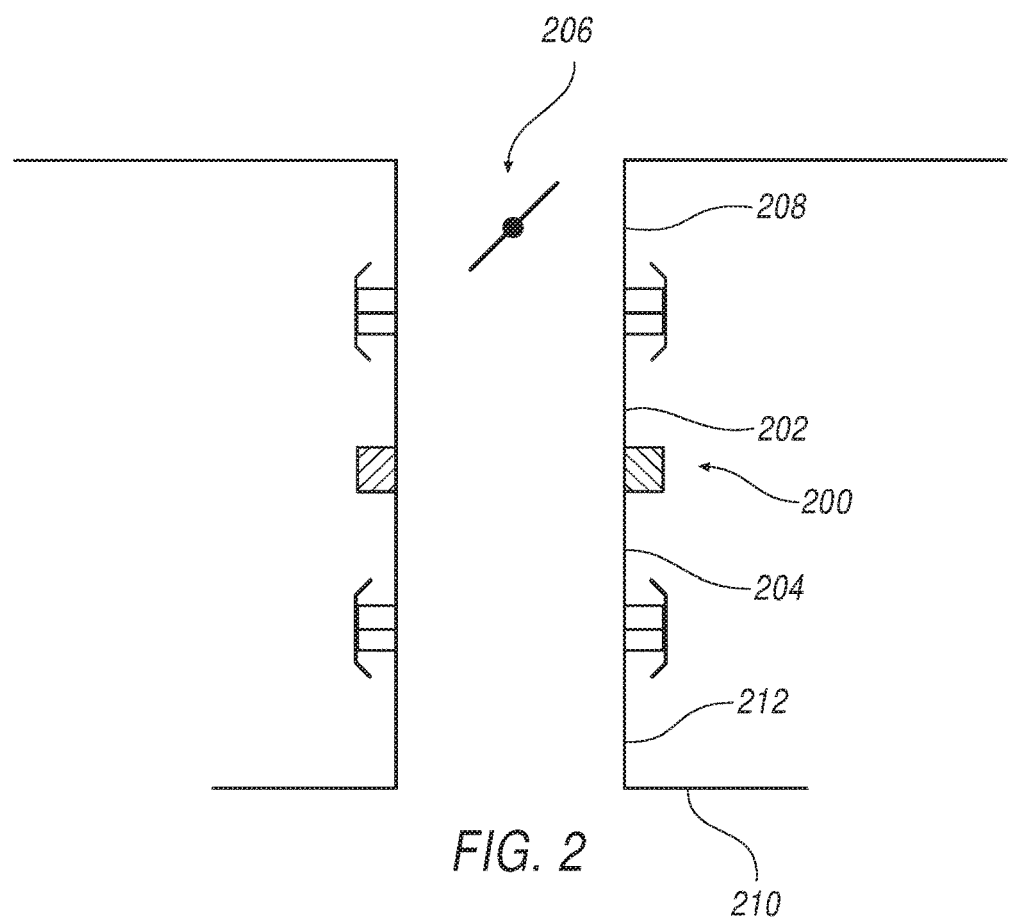
FIG. 2 illustrates a cross-sectional view of another exemplary duct coupling system coupled to an outflow valve.

FIG. 2 illustrates a cross-sectional view of another exemplary duct coupling system 200. Similar to the duct coupling system 100 of FIG. 1, the duct coupling system 200 of FIG. 2 couples a first duct 202 to a second duct 204 and attenuates vibrations (and noise) passing through the first or second duct 202, 204. The duct coupling system 200 is resilient and is able to support an outflow valve 206 if needed.

Unlike the duct coupling system 100 of FIG. 1, the first duct 202 of FIG. 2 does not have the outflow valve 206 integrated therein. Rather, the first duct 202 is coupled to additional ducting 208 having the outflow valve 206 integrated therein. Further, unlike the second duct 106 of FIG. 1, the second duct 204 of FIG. 2 does not open to an aircraft cabin 210. Rather, the second duct 204 is coupled to other additional ducting 212.

While not shown, other duct coupling systems may employ ducting configurations different than those shown in FIGS. 1 and 2.

Figure 3A:
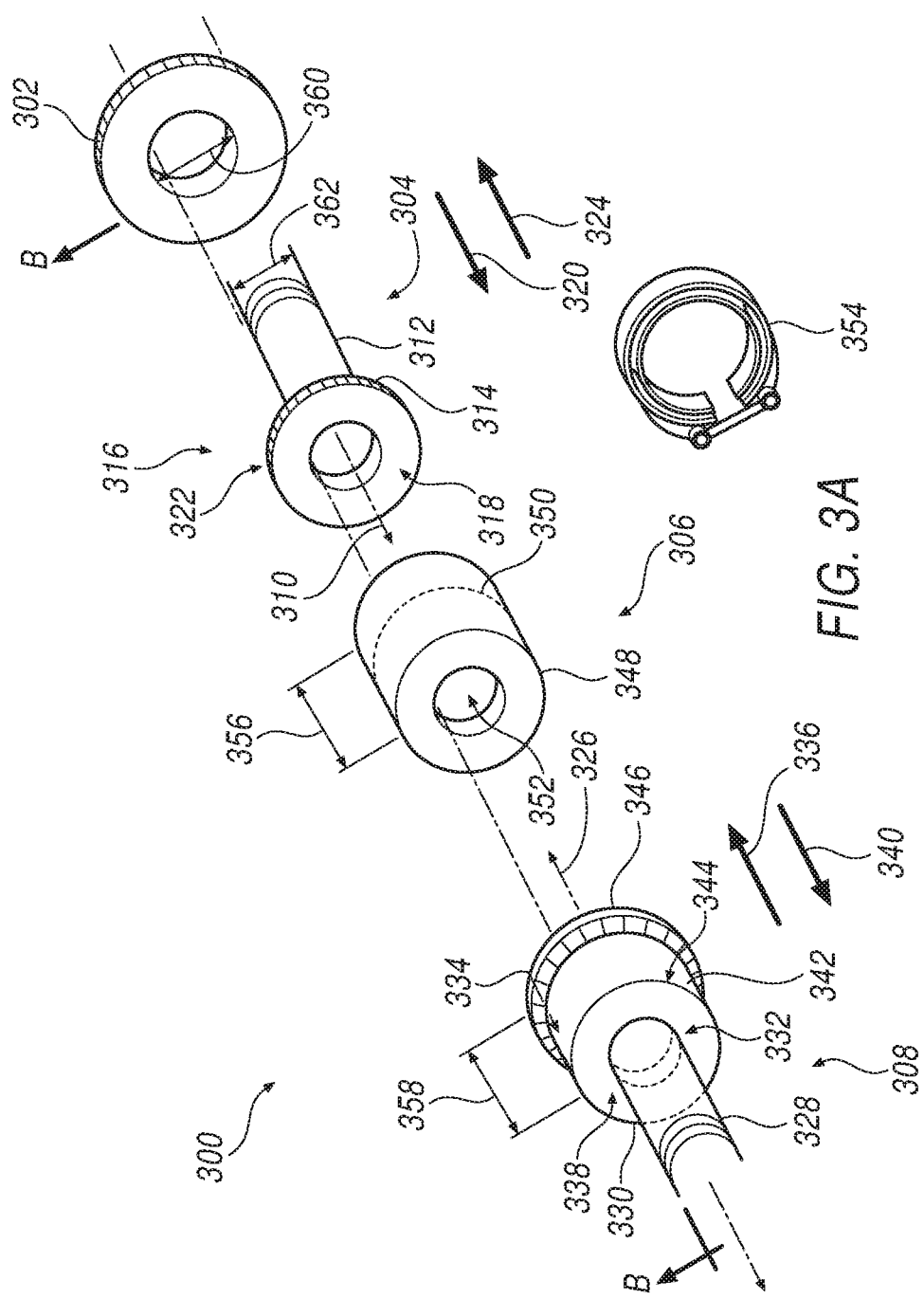
FIG. 3A illustrates an exploded perspective view of another exemplary duct coupling system.

Referring now to FIG. 3A, a perspective exploded view of an exemplary duct coupling system 300 is shown. The duct coupling system 300 includes a rigid ring 302, a first duct 304, a vibration attenuating system 306, and a second duct 308. As will be described in detail below, the rigid ring 302 passes over the first duct 304 and is fastened to the second duct 308. When fastened, the vibration attenuating system 306 is compressed between portions of the first duct 302 and the second duct 308 by the rigid ring 302 to form a strong union between the first duct 302 and the second duct 308. This union is accomplished without direct contact between the first duct 302 and the second duct 308. In addition to creating a strong union, the duct coupling system 300 attenuates vibration (and noise) that may pass through the system 300. Details of the duct coupling system 300 follows.

The first duct 304 has a first longitudinal axis 310 therethrough. Further, the first duct 304 includes a first duct wall 312 and a first flange 314 radiating outward from a first end 316 of the first duct wall 312. The first flange 314 has a first side 318 facing a first direction 320 along the first longitudinal axis 310 and a second side 322 facing a second direction 324 along the longitudinal axis 310. The first direction 320 is opposite the second direction 324.

The second duct 308 has a second longitudinal axis 326 therethrough. The second duct 308 has a second duct wall 328 and a second flange 330 radiating outward from a first end 332 of the second duct wall 328. The second flange has a first side 334 facing a first direction 336 along the second longitudinal axis 326 and a second side 338 facing a second direction 340 along the second longitudinal axis 326. The first direction 336 is opposite the second direction 340.

The second flange 330 also has a cylindrical wall 342 projecting laterally from an outer circumference 344 of the second flange 330. That is, the cylindrical wall 342 projects transversely from the second flange 330 in the first direction 336 of the second longitudinal axis 326. A lip 346 or ridge radially projects outwardly from the cylindrical wall 342, adjacent first side 334 in the illustrated example.

The vibration attenuating system 306 is illustrated in one exemplary approach as a single circular flexible gasket 348 having a thin slot 350 accessible from an interior 352 (i.e., the inner circumference) of the circular flexible gasket 348. The vibration attenuating system 306 may, for example, be comprised of rubber or some other type of elastomeric material.

As will be described in detail below with respect to FIG. 3B, a v-band clamp 354 may be employed as a fastening system to couple the rigid ring 302 to the lip 346 of the cylindrical wall 342.

Figure 3B:
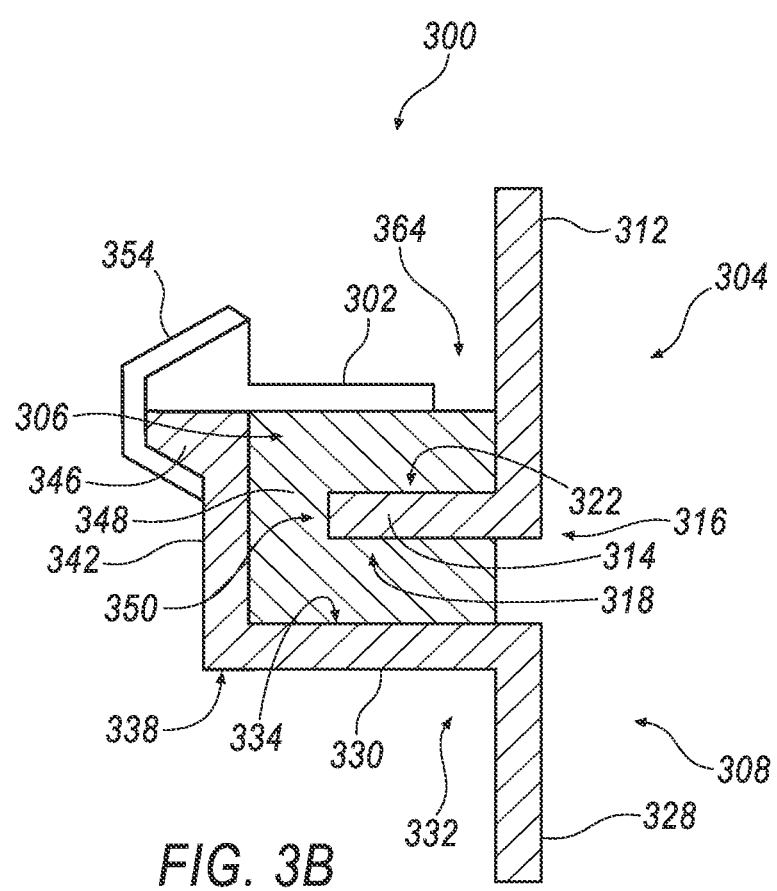
FIG. 3B illustrates a partial cross-sectional view of the duct coupling system of FIG. 3A.

With reference now to FIG. 3B, an assembled view of the duct coupling system 300 along B-B of FIG. 3A is shown in cross-section. The duct wall 312 of the first duct 304 passes through the rigid ring 302. Since a length 356 (see FIG. 3A) of the gasket 348 is slightly greater that a length 358 (see FIG. 3A) of the cylindrical wall 342, the rigid ring 302 shown in FIG. 3B abuts and compresses the vibration attenuating system 306 (i.e., circular flexible gasket 348) when it is fastened to the lip 346 of the cylindrical wall 342. The rigid ring 302 may, for example, be comprised of a metallic material such as steel, iron, stiff aluminum or another stiff or rigid material such as a stiff polymer or the like. Nonetheless, when the rigid ring 302 is fastened to the lip 346, the vibration attenuating system 306 abuts the first side 318 and the second side 322 of the first flange 314 and abuts the first side 334 of the second flange 330. The first flange 314 rests in the slot 350 (see also FIG. 3A) of the circular flexible gasket 348 (FIG. 3B). Accordingly, a portion of the vibration attenuating system 306 encircles the first flange 314 of first duct 304.

The fastening system (i.e., the v-band clamp 354) couples the first end 316 of the first duct 304 to the first end 332 of the second duct 308 by clamping the rigid ring 302 to the lip 346 of the cylindrical wall 342 of the second duct 308. When clamped, the v-band clamp 354 aligns the rigid ring 302 with the lip 346 of the cylindrical wall 342. As previously mentioned, the length 356 of the circular flexible gasket 348 is slightly longer the length 358 of the cylindrical wall 342. Though not shown, when initially aligned, there is a slight gap between the rigid ring 302 and the lip 346 due to the longer length 356 of the circular gasket 348. As the v-band clamp 354 is tightened, portions of the clamp 354 ride up a ramp of lip 346 and a ramp of the rigid ring 302 to cause the rigid ring 302 to compress the longer length 356 of the circular flexible gasket 348 until the rigid ring 302 meets the lip 364. As such, a tight seal and a structurally solid union between the first duct 304 and the second duct 308 is formed.

Since an inner diameter 360 (see FIG. 3A) of the rigid ring 302 is greater than an outer diameter 362 (see FIG. 3A) of the first duct wall 312, the rigid ring 302 illustrated in FIG. 3B surrounds, but avoids contacting, the first duct wall 312 of the first duct 304 when assembled. In other words, there is a gap 364 between the rigid ring 302 and the first duct wall 312. Although the rigid ring 302 and first duct 304 are coupled to the second duct 308, there is no direct contact between the rigid ring 302 and the first duct 304 or between the first duct 304 and the second duct 308. As such, any vibrations passing between the first duct 304 and the second duct 308 are attenuated by the vibration attenuating system 306 (i.e., circular flexible gasket), rather than being directly transferred to the rigid ring 302 or second duct 308. Not only does the union between the first duct 304 and the second duct 308 attenuate vibrations, the union is resilient and able to support an outflow valve (see e.g., outflow valves 102, 206 respectively of FIGS. 1 and 2) that may be coupled to the first or second duct 304, 308.

Figure 4:
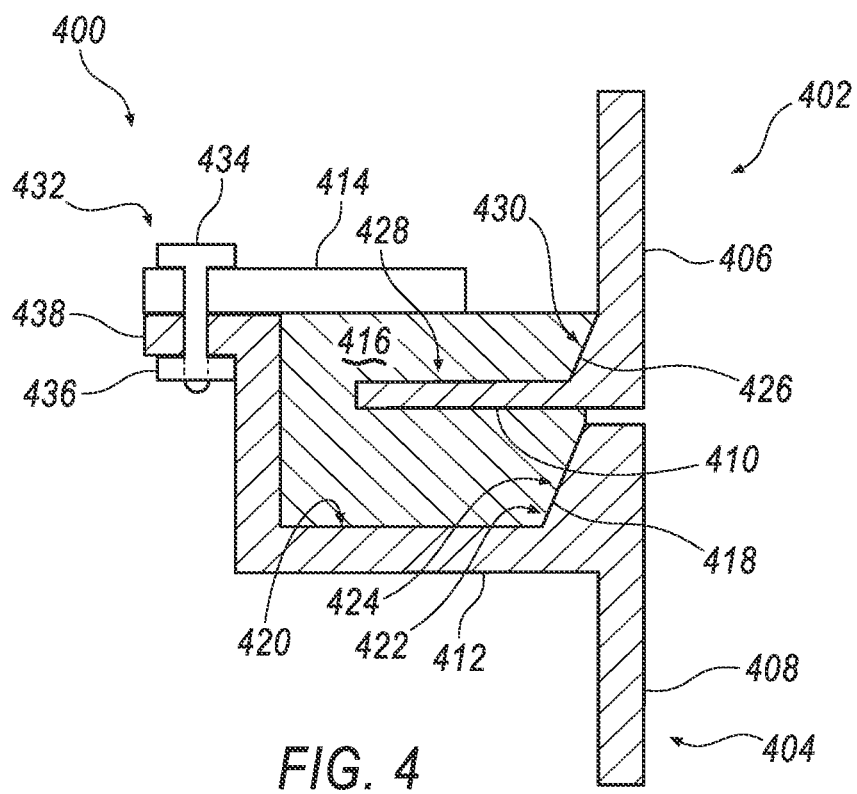
FIG. 4 illustrates a partial cross-sectional view of another exemplary duct coupling system.

With reference now to FIG. 4, a portion of another exemplary duct coupling system 400 is shown in a partial cross-section view. Like other examples, the duct coupling system 400 includes a first duct 402 and a second duct 404, where each duct 400, 402 includes respective duct wall 406, 408. Further, the system 400 includes a first flange 410, a second flange 412, a rigid ring 414, and a vibration attenuation system (i.e., flexible ring or single circular flexible gasket 416).

The duct coupling system 400, however, also includes a first angular shoulder 418 on a first side 420 of the second flange 412 and around an inner circumference 422 of the second flange 412. A complimentary angle in the form of a ramp 424 is illustrated on the circular flexible gasket 416. Together, the first shoulder 418 and the ramp 424 of the circular gasket 416 are shown engaging one another and thereby working together to make alignment of the first duct 402 with the second duct 404 easier during installation.

A second shoulder 426 extending from the first duct wall 406 to a second side 428 of the first flange 410 forms a non-perpendicular transition (e.g., illustrated as an angled ramp) between the first duct wall 406 and the second side 428 of the first flange 410. The second shoulder 426 along with another complimentary angle 430 on the circular flexible gasket 416 aids in centering the circular flexible gasket 416 during installation.

The single circular flexible gasket 416 attenuates vibrations and noise passing between the first duct 402 to the second duct 404, while also creating a strong union between the first duct 402 and the second duct 404.

Unlike the duct coupling system 300 of FIGS. 3A-3B, a fastening system 432 of FIG. 4 includes a threaded fastener 434 (e.g., bolt) and a nut 436, rather than the v-band clamp 354 (see FIGS. 3A-3B). While the cross-sectional view of FIG. 4 illustrates one fastener 434 and nut 436, the entire system 400 includes a plurality of bolts (e.g., bolt 434) and nuts (e.g., nut 436). As such, the rigid ring 414 and lip 438 would include a plurality of apertures (not shown) through the circumference of each that align so that each fastener or bolt may be placed therethrough.

Figure 5:
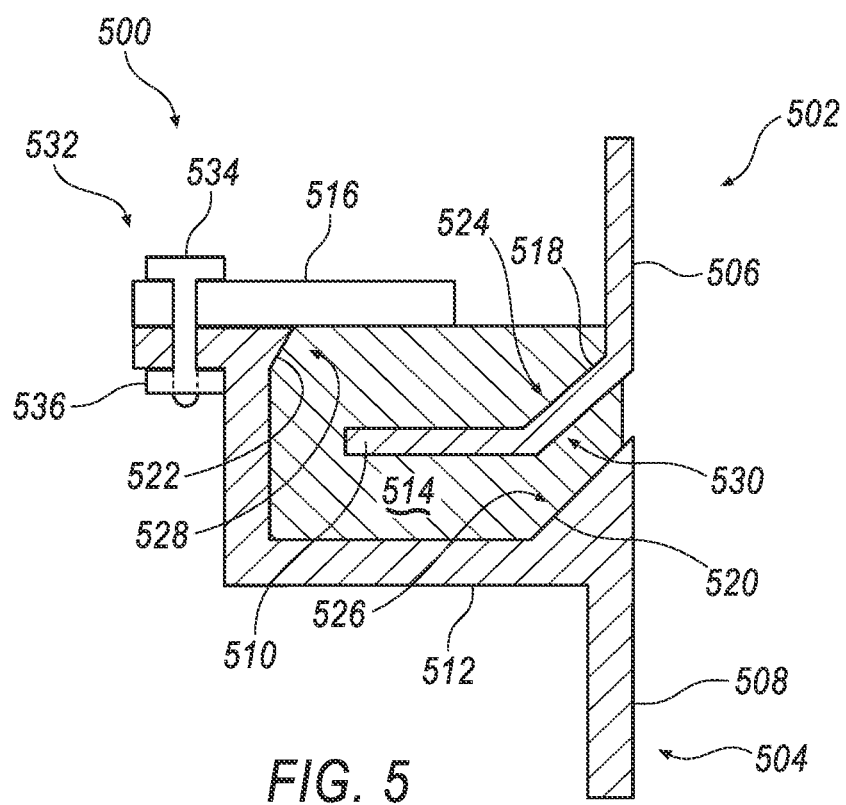
FIG. 5 illustrates a partial cross-sectional view of another exemplary duct coupling system.

FIG. 5 illustrates yet another example of a duct coupling system 500 in a partial cross-section view. Like other examples, the duct coupling system 500 includes a first duct 502 and a second duct 504, where each duct 502, 504 includes a respective duct wall 506, 508. The duct coupling system 500 also includes a first flange 510, a second flange 512, a flexible gasket 514, a rigid ring 516, a first shoulder 518, and a second shoulder 520, and a third shoulder 522. Further, the flexible gasket 514 includes a first, second, and third ramp 524, 526, 528, each having a complimentary angle to the respective first, second, and third shoulder 518, 520, 522. The third shoulder 522 applies a force to the flexible gasket 514 that is directed towards the first flange 510 and adds integrity to the union between the first flange 510 and the second flange 512.

The first shoulder 518 transitions between the first duct wall 506 and the first flange 510. Further, an outside portion 530 of the first shoulder 518 provides a tolerance to the duct coupling system 500, ensuring that the first duct 502 avoids contacting the second duct 504 if the flexible gasket 514 flexes or further compresses. That is, since the outside portion 530 of the first shoulder 518 slopes away from the second duct wall 508, additional space is provided between the first duct wall 506 and the second duct wall 508. The additional space created by the sloping first shoulder 518 allows the system 500 to tolerate additional flexing or compression of the flexible gasket 514 and still avoid contact between the first duct 502 (e.g., first duct wall 506) and the second duct 504 (e.g., second duct wall 508).

The duct coupling system 500 also includes a fastening system 532 that includes a threaded fastener (e.g., a bolt) 534 and a nut 536. When the rigid ring 516 is fastened to the second flange 512 via the fastening system 532, the rigid ring 516 compresses the flexible gasket 514 into the first flange 510 and the second flange 512 to create a strong union between the first duct 502 and the second duct 504 that attenuates vibrations (and noise). Alternate fastening systems (e.g., clips, clamps, and/or rivets) may be used so long as the disclosed vibration and noise attenuation are still appropriately addressed.

Figure 6A:
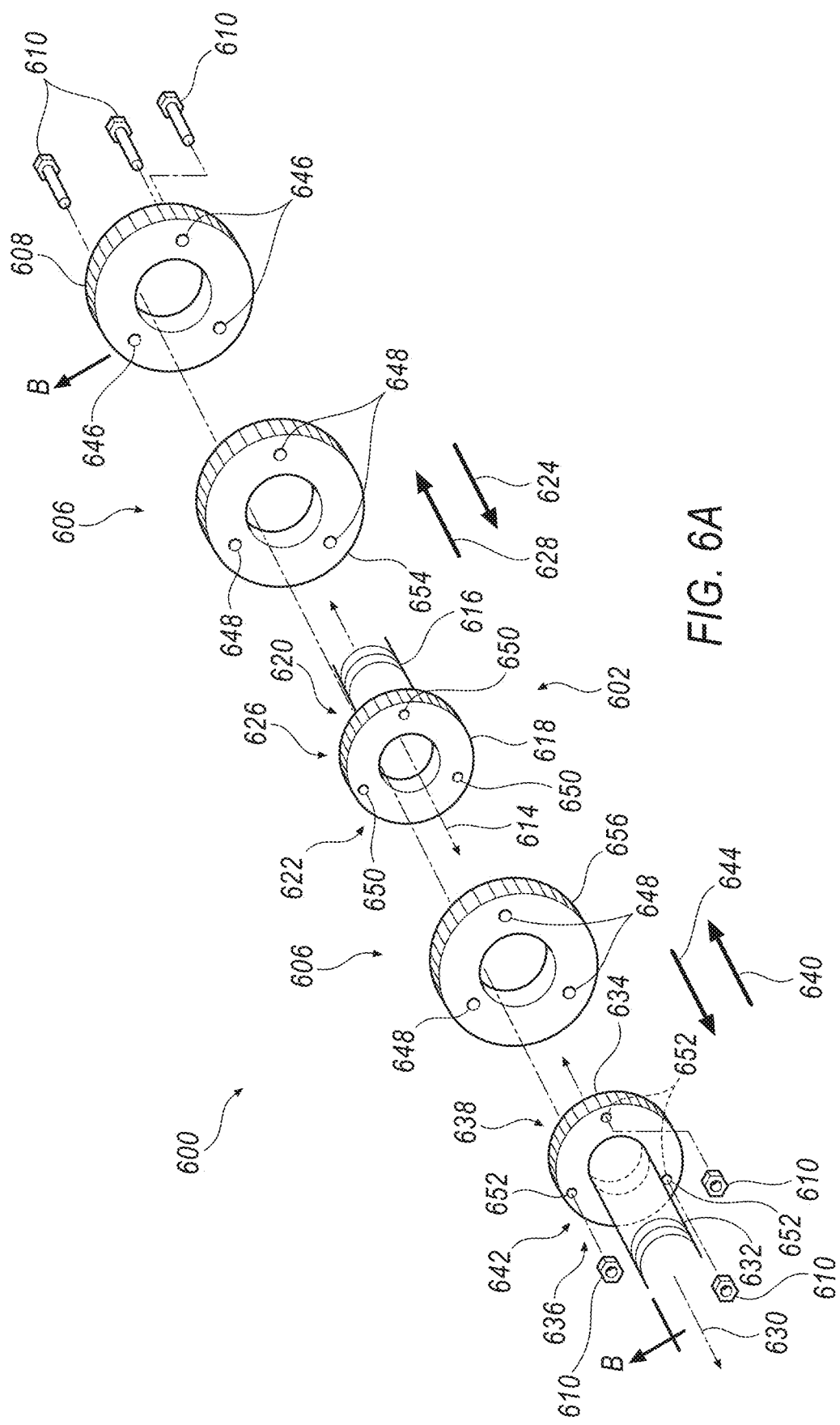
FIG. 6A illustrates an exploded perspective view of another exemplary duct coupling system.

With reference now to FIG. 6A, an exploded perspective view of another exemplary duct coupling system 600 is shown. The duct coupling system 600 includes a first duct 602, a second duct 604, a vibration attenuating system 606, a rigid ring 608, and a plurality of fasteners 610.

As will be described in detail below, the rigid ring 608 passes over the first duct 602 and is fastened to the second duct 604. When the rigid ring 608 is fastened to the second duct 604 via the fasteners 610, the vibration attenuating system 606 is compressed between portions of the first duct 602 and the second duct 604 by the rigid ring 608 to form a strong union between the first duct 602 and the second duct 604. This union is accomplished without direct contact between the first duct 602 and the second duct 604. In addition to creating a strong union, the duct coupling system 600 attenuates vibration (and noise) that may pass through the system 600. Details of the duct coupling system 600 follows.

The first duct 602 has a longitudinal axis 614 therethrough. Further, the first duct 602 includes a first duct wall 616 and a first flange 618 radiating outward from a first end 620 of the first duct wall 616. The first flange 618 has a first side 622 facing a first direction 624 along the longitudinal axis 614 and a second side 626 facing a second direction 628 along the longitudinal axis 614. The first direction 624 is opposite the second direction 628.

The second duct 604 also has a longitudinal axis 630 therethrough. The second duct 604 also includes a second duct wall 632 and a second flange 634 radiating outward from a first end 636 of the second duct wall 632. The second flange 634 has a first side 638 facing a first direction 640 along the longitudinal axis 630 and a second side 642 facing a second direction 644 along the longitudinal axis 630. The first side 638 is opposite the second side 642. The flanges 618, 634 may be comprised of the same stiff material as the duct walls 616, 632 (e.g., aluminum or PVC), or they may be comprised of a different stiff material.

The rigid ring 608 includes a plurality of apertures 646 therethrough, the vibration attenuating system 606 includes a plurality of apertures 648 therethrough, the first flange 618 includes a plurality of apertures 650 therethrough, and the second flange 634 includes a plurality of apertures 652 therethrough.

The vibration attenuating system 606 includes a first flexible ring 654 and a second flexible ring 656. The flexible rings or gaskets 654, 656 are comprised of a resilient flexible material. For example, the flexible rings 654, 656 may be comprised of rubber or another type elastomeric material. The first flexible ring 654 is configured to encircle the first duct wall 616 and abut the second side 626 of the first flange 618 and the rigid ring 608. The second flexible ring 656 is configured to abut the first side 638 of the second flange 634 and the first side 622 of the first flange 618. Together, the first flexible ring 654 and the second flexible ring 656 are configured to attenuate vibrations passing between the first duct 602 to the second duct 604.

Figure 6B:
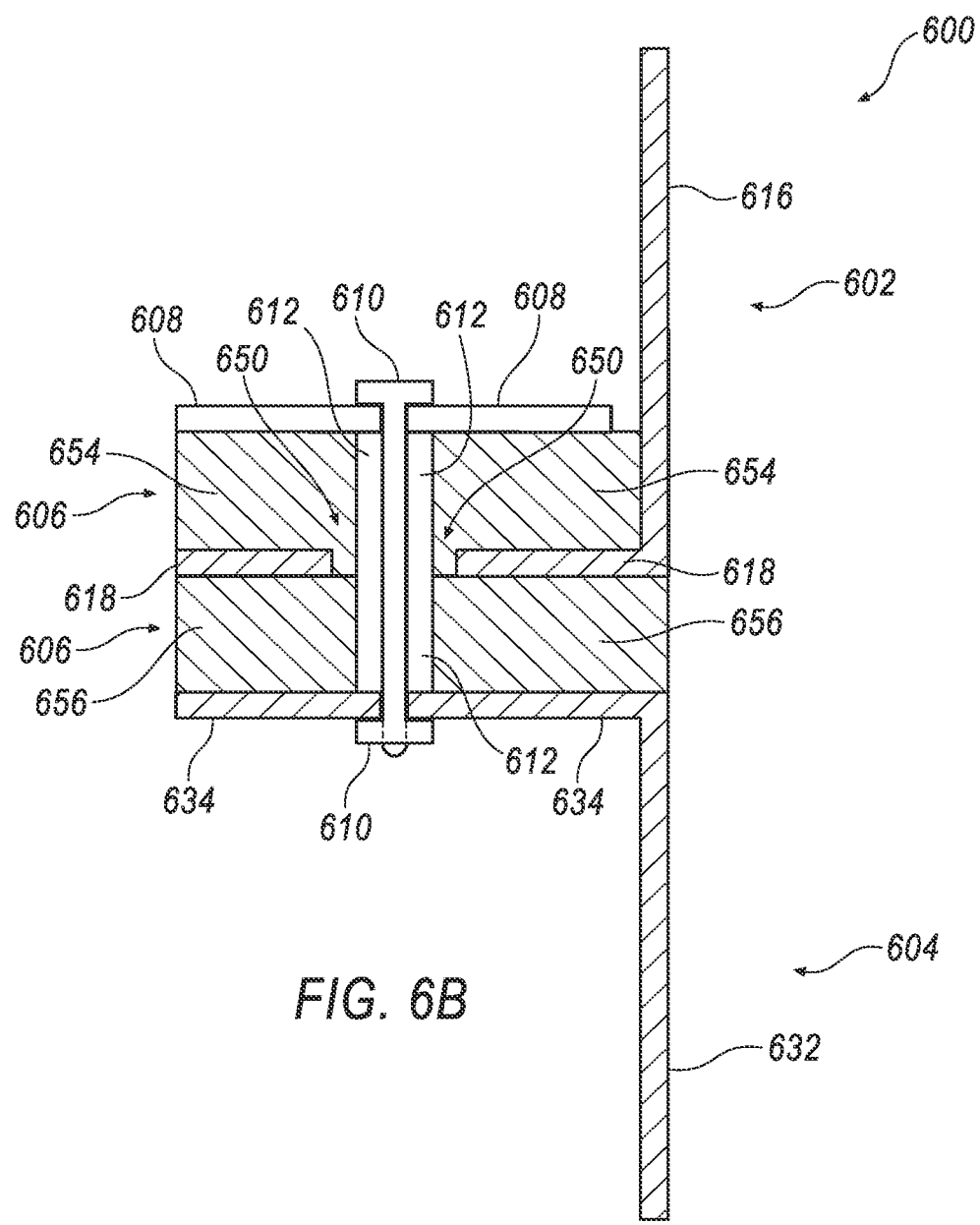
FIG. 6B illustrates a partial cross-sectional view of the duct coupling system of FIG. 6A.

Referring now to FIG. 6B, an assembled view of the exemplary duct coupling system 600 is shown in cross-section along B-B of FIG. 6A. The first duct wall 616 passes through the rigid ring 608. When the rigid ring 608 is fastened by the second duct 604, the first flexible ring 654 compresses into the second side 626 (see FIG. 6A) of the first flange 618. Further, the second flexible ring 656 is compressed by the first side 638 (see FIG. 6A) of the second flange 634 and the first side 638 (see FIG. 6A) of the first flange 618. The rigid ring 608 is comprised of a material that has the integrity to compress the vibration attenuating system 606 (i.e., the flexible rings 654, 656) when it is fastened via the fasteners 610 to the second duct 604. For example, the rigid ring 608 may be comprised of a stiff or rigid PVC or metallic material such as steel.

The fastener sleeve 612, as shown in FIG. 6B, may be included to prevent over-compression. That is, the sleeve 612 may be passed through the apertures 646-652 during assembly. When the fastener 610 is tightened, the sleeve 612 may prevent or at least minimize overtightening by providing an opposing force to the fastener 610 during installation. The sleeves 612 may, for example, be comprised of a stiff metallic material (e.g., aluminum or iron) or other material that prevents over-compression or provides an installer tactile feedback when coupling the system 600 together. A solid union between the first duct 602 and the second duct 604 can therefore be created while minimizing possible over-compression of the flexible rings. 654, 656. Such a union is strong enough to support an outflow valve (see, e.g., FIGS. 1 and 2) coupled to either the first or second duct 602, 604.

Since the rigid ring 608 does not contact the first duct 602, and the first duct 602 does not contact the second duct 604, vibrations passing from the first duct 602 to the second duct 604 (or vice versa) are minimized. That is, the flexible rings 654, 656 attenuate vibrations originating from either the first duct 602 or the second duct 604. These flexible rings (or gaskets) 654, 656 may, for example, be comprised of a rubber material or other resilient flexible material.

It is noted that portions of the first flexible ring 654 pass into the apertures 650 of the first flange 618. As such, while the sleeve 612 and fastener 610 may make contact with the rigid ring 608 and second flange 634, neither makes contact with the first flange 618.

Figure 7:
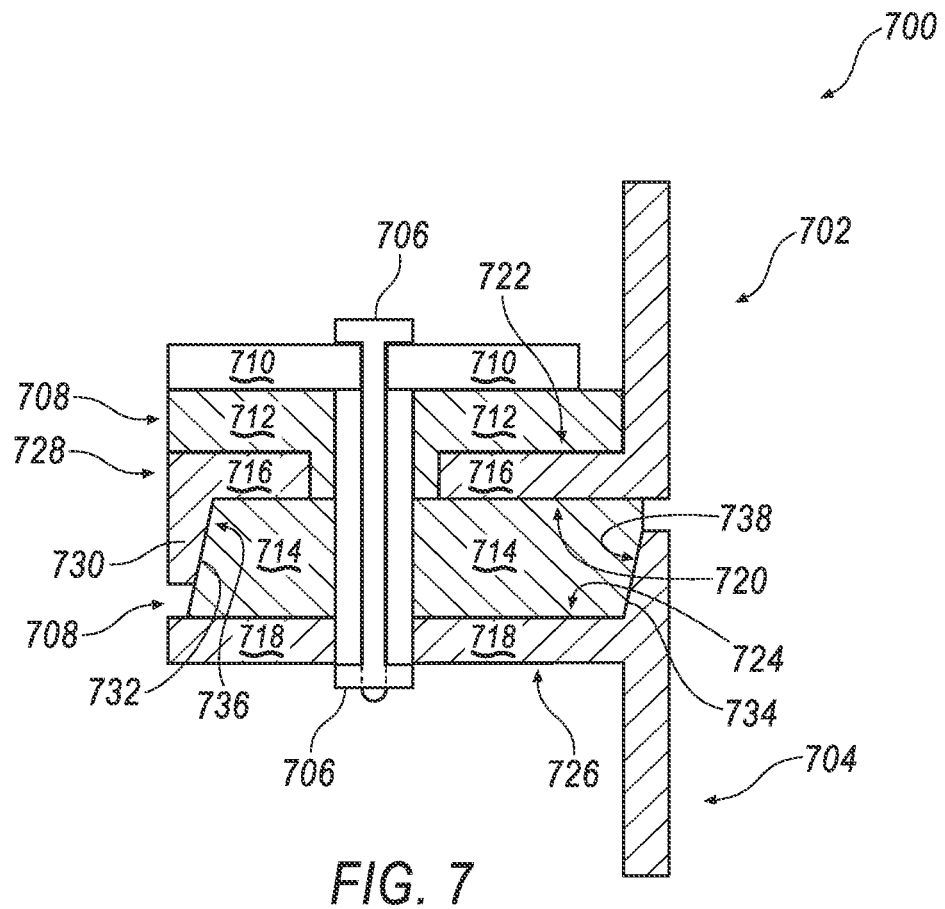
FIG. 7 illustrates a partial cross-sectional view of another exemplary duct coupling system.

FIG. 7 illustrates yet another portion of a duct coupling system 700 shown in a partial cross-section. Like other examples, the duct coupling system 700 includes a first duct 702, a second duct 704, a fastening system 706, a vibration attenuating system 708, and a rigid ring 710.

The vibration attenuating system 708 includes a first flexible ring 712 and a second flexible ring 714, that together help to attenuate vibrations passing between ducts 702, 704.

The first duct 702 includes a first flange 716 radiating outward and the first duct 704. The second duct 704 includes a second flange 718 radiating outward from the second duct 704. The first flange 716 includes a first side 720 and a second side 722 opposite the first side. The second flange 718 also includes a first side 724 and a second side 726 opposite the first side 724.

The rigid ring 710 compresses the first flexible ring 712 into the second side 722 of the first flange 716 and causes the second flexible ring 714 to become compressed between the first side 720 of the first flange 716 and the first side 724 of the second flange 718. As such, a strong union between the first and second ducts 702, 704 is created, while at the same time vibrations passing between the first and second ducts 702, 704 are attenuated. Since the union between the first and second ducts 702, 704 is strong, the union is capable of supporting an outflow valve (not shown) coupled to either duct 702, 704.

Projecting laterally from an outer circumference 728 of the first side 720 of the first flange 716 is a cylindrical wall 730 (shown in cross-section). The cylindrical wall 730 encircles the second flexible ring 714. Along an interior of the cylindrical wall 730 and terminating at the first side 720 of the first flange 716 is a first centering shoulder 732. A second centering shoulder 734 is along an inner circumference of the first side 724 of the second flange 718. The second flexible ring 714 includes a complimentary angle 736 to the first centering shoulder 732 and another complimentary angle 738 to the second centering shoulder 734. Together, the complimentary angles 736, 738 of the second flexible ring 714 and the centering shoulders 732, 734 aid in alignment of the first duct 702 with the second duct 704 during installation.

Figure 8:
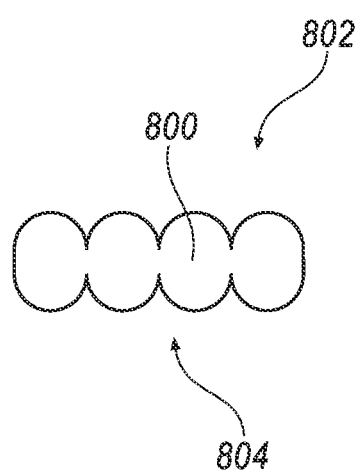
FIG. 8 illustrate an exemplary gasket material that may be used with duct coupling systems.

Referring now to FIG. 8, a cross-sectional view of a portion of an exemplary flexible ring 800 is shown. The exemplary flexible ring 800 may be the type of flexible ring or gasket employed in coupling systems discussed herein. For example, the first and/or second flexible rings 712, 714 of FIG. 7 may employ the flexible ring 800 of FIG. 8.

The exemplary flexible ring 800 includes a top surface 802 and a bottom surface 804. Each surface 802, 804 has a corrugated texture. The corrugated texture of each surface 802, 804 helps to decrease the amount of force needed compress 806 the flexible ring 800. For example, if the first flexible ring 712 of FIG. 7 had a corrugated top and bottom surface (e.g., the top and bottom surfaces 802, 804 of FIG. 8) rather than the flat surfaces shown, the amount of force needed to compress the flexible ring 712 via the rigid ring 710 would be decreased.

The force needed is decreased because the rigid ring 710 would have less initial contact with the top corrugated surface and the second side 722 of the first flange 716 would have less initial contact with the bottom corrugated surface.

Figure 9:
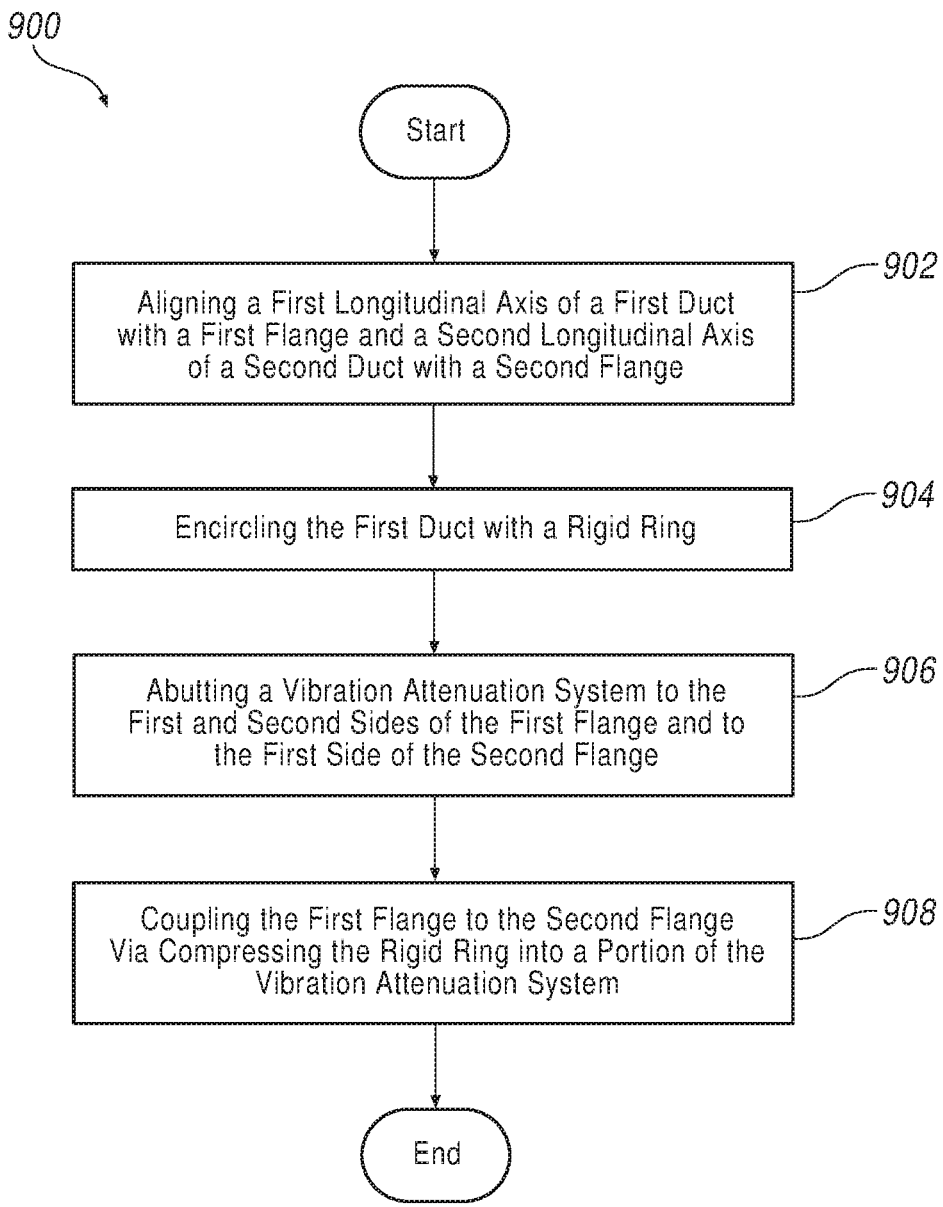
FIG. 9 is a flowchart depicting an exemplary technique for assembly of a duct coupling system.

With reference now to FIG. 9, a flowchart setting forth an exemplary technique 900 of coupling a first duct to a second duct is shown.

Exemplary technique 900 begins at BLOCK 902, where aligning a first longitudinal axis of a first duct with a first flange and a second longitudinal axis of a second duct with a second flange is carried out. The first flange has a first side and a second side opposite the first side. The second flange has a first side and a second side opposite the first side. The first side of each flange faces each other.

Encircling the first duct with a rigid ring then occurs at BLOCK 904. Exemplary process control then proceeds to abutting a vibration attenuation system to the first and second sides of the first flange and to the first side of the second flange at BLOCK 906. It is noted that a portion of the vibration attenuation system encircles the first duct.

Technique 900 continues as process control proceeds to BLOCK 908, where coupling the first flange to the second flange via compressing the rigid ring into the portion of the vibration attenuation system encircling the first duct into the first flange occurs. During the coupling, the rigid ring does not contact the first duct and the first duct does not contact the second duct.

Process control then proceeds to an END.

While an order may be inferred from exemplary technique 900 and the corresponding flowchart of FIG. 9, other exemplary techniques may carry out a different order to BLOCKS 902-908. For example, encircling the first duct with the rigid ring at BLOCK 904 could occur prior to aligning the first duct with the second duct at BLOCK 902. Still other alternatives to technique 900 not discussed could also be carried out.

While not shown, technique 900 could also include: (i) encircling a first flexible ring of the vibration attenuation system around the first duct such that the first flexible ring is between the rigid ring and the second side of the first flange and (ii) aligning a second flexible ring of the vibration attenuation system between the first flange and the second flange such that the second flexible ring is on the first side of the first flange and the first side of the second flange.

Further, technique 900 could also include placing a plurality of sleeves respectively through: (i) a plurality of apertures in the rigid ring; (ii) a plurality of apertures in the first flexible ring; (iii) a plurality of apertures in the first flange; and (iv) a plurality of apertures in the second flexible ring. In such an instance, technique 900 could carry out the coupling of the first flange to the second flange by placing a plurality of fasteners respectively though: (i) the plurality of apertures in the rigid ring; (ii) the plurality of apertures in the first flexible ring; (iii) the plurality of apertures in the first flange; (iv) the plurality of apertures in the second flexible ring; and (v) a plurality of apertures in the second flange.

If a single gasket is employed as the vibration attenuation system instead of the first flexible ring and the second flexible ring, technique 900 could include inserting the first flange into a single circular gasket to carry out the abutting of the vibration attenuation system to the first and second sides of the first flange.

With regard to FIGS. 1-9 and the processes, systems, methods, techniques, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of terms such as "first," "second," "third," and the like that immediately precede an element(s) do not necessarily indicate sequence unless set forth otherwise, either explicitly or inferred through context.

The invention claimed is:

1. A duct coupling system comprising:
    a first duct having a first flange radiating outwardly from a first end of the first duct, wherein the first flange has a first side and a second side opposite the first side;
    a second duct aligned longitudinally with the first duct, the second duct having a second flange radiating outwardly from a first end of the second duct, wherein the second flange has a first side and a second side opposite the first side, and wherein the first flange includes a plurality of first flange apertures therethrough and the second flange includes a plurality of second flange apertures therethrough;
    a vibration attenuating system configured to attenuate vibrations passing between the first duct to the second duct, the vibration attenuating system comprises:
        a first flexible gasket having a plurality of first gasket apertures therethrough, the first flexible gasket being configured to encircle the first duct and abut the second side of the first flange; and
        a second flexible gasket having a plurality of second gasket apertures therethrough, the second flexible gasket being configured to abut the first side of the second flange and the first side of the first flange, wherein the plurality of first flange apertures align with the plurality of second flange apertures, the plurality of first gasket apertures, and the plurality of second gasket apertures;
    wherein the duct coupling system further comprises:
        a rigid ring encircling the first duct and abutting the first flexible gasket, the rigid ring having a plurality of rigid ring apertures therethrough that aligns with the plurality of first gasket apertures, first flange apertures, second gasket apertures, and second flange apertures;
        a fastening system to couple the first flange to the second flange, the fastening system compressing the rigid ring into the portion of the vibration attenuating system, wherein the rigid ring avoids contact with the first duct when the fastening system compresses the vibration attenuating system and the first duct avoids contact with the second duct; and
        a plurality of metallic sleeves configured to at least one of (i) respectively align with the plurality of first flange apertures, the second flange apertures, the first gasket apertures, and the second gasket apertures and (ii) prevent over-compression of the first and second flexible gaskets.

2. The system of claim 1 wherein portions of the first flexible gasket are configured to pass into the plurality of first flange apertures.

3. The system of claim 1 wherein the rigid ring further avoids contact with the second duct when the fastening system compresses the vibration attenuating system.

4. The system of claim 1 wherein at least one of the first and second flexible gaskets has at least a top surface that is corrugated.

5. The system of claim 1, the first duct further comprising:
    a cylindrical wall projecting laterally from an outer circumference of the first side of the first flange and encircling the second flexible gasket; and
    a first centering shoulder along an interior of the cylindrical wall and terminating at the first side of the first flange, and wherein the second duct further comprises a second centering shoulder along an inner circumference of the first side of the second flange, the first and second centering shoulders minimize misalignment of the first flange with the second flange.

6. A duct coupling system comprising:
    a first duct having a first longitudinal axis, the first duct having a first duct wall and a first flange radiating outward from a first end of the first duct wall, wherein the first flange has a first side facing a first direction along the first longitudinal axis and a second side facing a second direction along the longitudinal axis, the first direction being opposite the second direction, and wherein the first flange includes a plurality of first flange apertures therethrough;
    a second duct having a second longitudinal axis, the second duct having a second duct wall and a second flange radiating outward from a first end of the second duct wall, wherein the second flange has a first side facing a first direction along the second longitudinal axis and a second side facing a second direction along the second longitudinal axis, the first direction being opposite the second direction, and wherein the second flange includes a plurality of second flange apertures therethrough;
    a vibration attenuating system circumferentially surrounding a portion of the first duct and being configured to attenuate vibrations passing between the first duct to the second duct, the vibration attenuating system comprises:
        a first flexible ring having a plurality of first flexible ring apertures therethrough, the first flexible ring being configured to encircle the first duct wall and abut the second side of the first flange; and
        a second flexible ring having a plurality of second flexible ring apertures therethrough, the second flexible ring being configured to abut the first side of the second flange and the first side of the first flange, wherein the second flexible ring apertures align with the first flexible ring apertures, the first flange apertures, and the second flange apertures;

wherein the duct coupling system further comprises
- a rigid ring surrounding the first duct wall and abutting the first flexible ring, the rigid ring having a plurality of rigid ring apertures therethrough that aligns with the plurality of first flexible ring apertures, the first flange apertures, the second flexible ring apertures, and the second flange apertures;
- a fastening system to couple the first duct to the second duct, the fastening system compressing the rigid ring into the vibration attenuating system, wherein the rigid ring avoids contacting the first duct when the fastening system compresses the vibration attenuating system and the first duct avoids contacting the second duct; and
- a plurality of metallic sleeves configured to at least one of (i) align with the first flange apertures, the second flange apertures, the first flexible ring apertures, and the second flexible ring apertures and (ii) prevent over-compression of the first and second flexible rings.

7. The system of claim 6, wherein portions of the first flexible ring passes into the plurality of first flange apertures, and wherein one of the first duct and the second duct is coupled to an outflow valve.

8. The system of claim 6 wherein the rigid ring further avoids contact with the second duct and the second flange.

9. The system of claim 6 wherein the system further comprises:
- a first non-perpendicular shoulder extending from the first side of the first flange; and
- a second non-perpendicular shoulder extending from the second duct wall to the first side of the second flange, wherein the first shoulder and the second shoulder aid in alignment of the first duct with the second duct.

10. A method comprising:
- aligning a first longitudinal axis of a first duct and a second longitudinal axis of a second duct, the first duct having a first flange with a first side and a second side opposite the first side, the second duct having a second flange with a first side and a second side opposite the first side;
- encircling a first flexible ring of a vibration attenuation system around the first duct such that the first flexible ring is on the second side of the first flange;
- encircling the first duct with a rigid ring such that the first flexible ring is between the rigid ring and the first flange;
- placing a second flexible ring of the vibration attenuation system between the first flange and the second flange such that the second flexible ring is on the first side of the first flange and the first side of the second flange;
- placing a plurality of sleeves through (i) a plurality of apertures in the first flexible ring, (ii) a plurality of apertures in the first flange, and (iii) a plurality of apertures in the second flexible ring; and
- coupling the first flange to the second flange via at least compressing the rigid ring into the first flexible ring, wherein the rigid ring avoids contacting the first duct and the first duct avoids contacting the second duct.

11. The method of claim 10 wherein portions of the first flexible ring are configured to pass into the plurality of apertures in the first flange.

12. The method of claim 10, wherein the first flange includes an alignment shoulder and the second duct includes an alignment shoulder, and wherein the alignment shoulder of the first flange and the alignment shoulder of the second duct are configured to aid in alignment of the first duct with the second flexible gasket and the second duct.

13. The method of claim 10 wherein coupling the first flange to the second flange comprises placing a plurality of fasteners respectively through (i) the plurality of apertures in the rigid ring, (ii) the plurality of sleeves, and (iii) a plurality of apertures in the second flange.

14. The method of claim 13 wherein the plurality of fasteners comprises a plurality of bolts.

* * * * *